United States Patent [19]

Brems et al.

[11] 3,991,590
[45] Nov. 16, 1976

[54] SAFETY OVERLOAD CLUTCH

[75] Inventors: John H. Brems, Birmingham; Neil J. Stalker; Peter H. Ohrnberger, both of Clarkston, all of Mich.

[73] Assignee: F. Jos. Lamb Company, Warren, Mich.

[22] Filed: Feb. 24, 1975

[21] Appl. No.: 552,764

Related U.S. Application Data

[63] Continuation of Ser. No. 466,961, May 6, 1974, abandoned.

[52] U.S. Cl. .................................. 64/29; 192/56 R
[51] Int. Cl.² ........................ F16D 3/56; F16D 7/00
[58] Field of Search .................. 64/29, 30 D, 30 E; 192/56 R

[56] References Cited
UNITED STATES PATENTS

| | | | |
|---|---|---|---|
| 1,325,464 | 12/1919 | Decker | 64/29 |
| 2,758,457 | 8/1956 | Meyer et al. | 64/29 |
| 2,960,852 | 11/1960 | Schroter et al. | 64/29 |
| 3,036,447 | 5/1962 | Wilhelmsson et al. | 64/29 |
| 3,067,597 | 12/1962 | Sauerbrey | 64/29 |
| 3,688,522 | 9/1972 | Schmuck | 64/29 |
| 3,770,086 | 11/1973 | Jackson et al. | 64/29 X |
| 3,889,491 | 6/1975 | Wanner et al. | 64/29 |

Primary Examiner—Samuel Scott
Assistant Examiner—Lance W. Chandler
Attorney, Agent, or Firm—Barnes, Kisselle, Raisch & Choate

[57] ABSTRACT

A safety overload clutch wherein the driving and driven members are retained in driving relation by a primary roller on one of the members urged radially into a groove on the other member by an elastic flexure ring loaded by one or more secondary rollers on the one member positioned substantially diametrically opposite the primary roller. When the load on the driven member exceeds a predetermined value, the primary roller rolls out of its groove causing additional deflection of the flexure ring.

13 Claims, 9 Drawing Figures

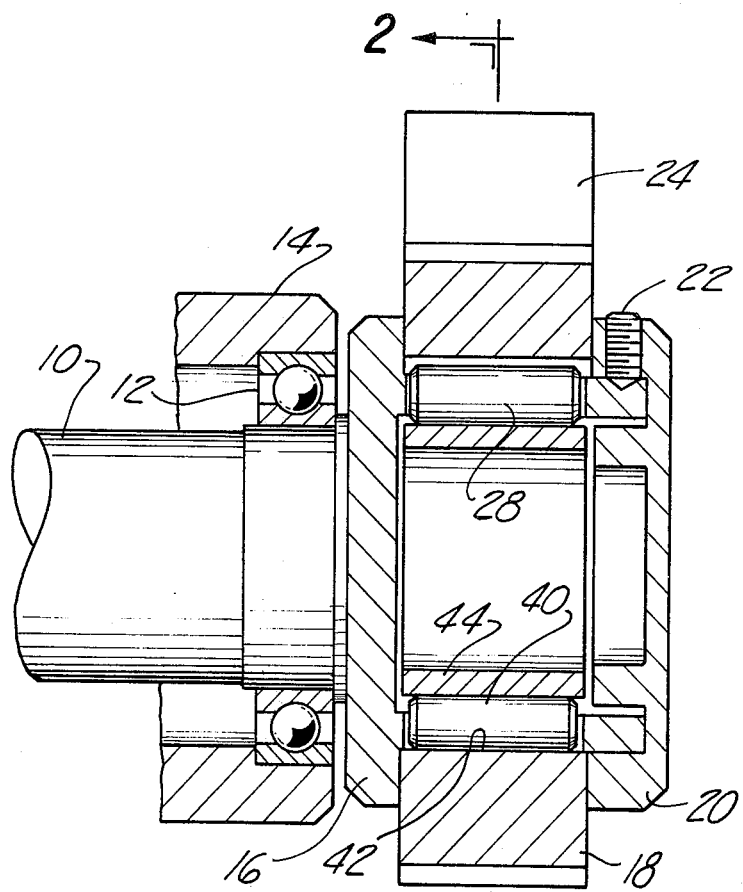
Fig-1
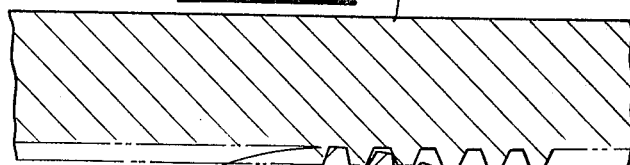
Fig-2
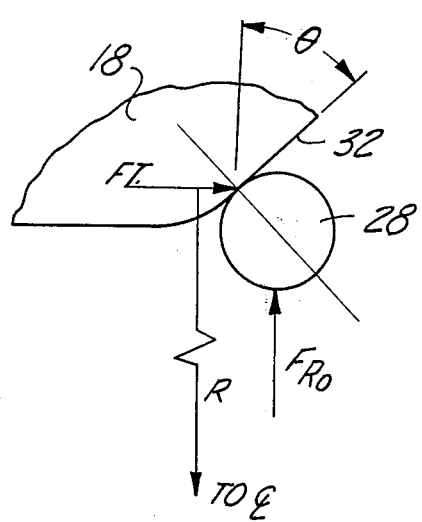
Fig-3
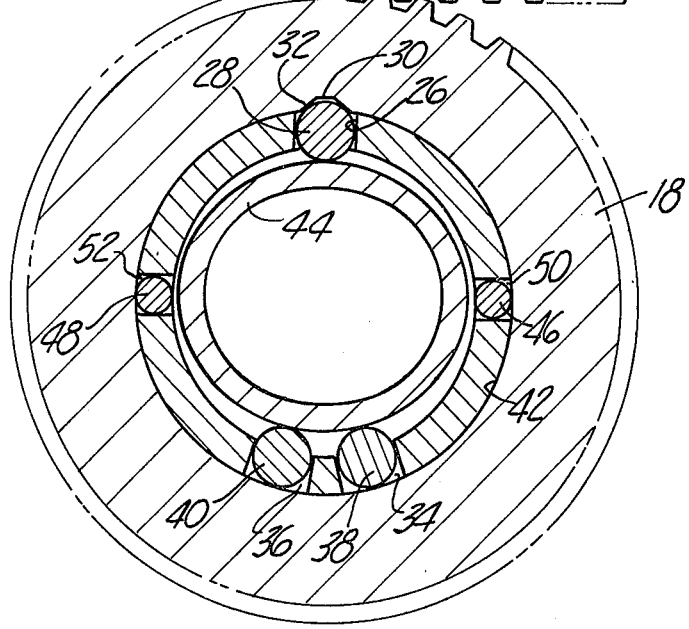

SAFETY OVERLOAD CLUTCH

This is a continuation of application Ser. No. 466,961, filed May 6, 1974, now abandoned.

This invention relates to an overload safety clutch which transmits torque between a driving member and a driven member until a predetermined torque load on the driven member is exceeded, at which point the transmitted torque drops to near zero.

It is an object of this invention to provide a clutch of economical construction in which the release torque may be accurately set by the design of a single component and such torque may thereafter be altered through the modification or replacement of this single component.

It is a further object of this invention to provide a clutch with a minimum of drag after the clutch has become disengaged and with a minimum of sliding contact between operative elements of the clutch.

It is a further object of this invention to provide a clutch adapted to re-engage only with a single angular orientation between the driving and the driven members.

It is a further object of this invention to provide a clutch having a high torque capacity in a small space and with a minimum of mechanical complexity.

Other objects and features of the present invention will become apparent from the following description and drawings, in which:

FIG. 1 is a fragmentary view, partly in section, of one embodiment of clutch accordiing to the present invention;

FIG. 2 is a sectional view along the line 2—2 in FIG. 1;

FIG. 3 and 4 are force vector diagrams illustrating the force vectors developed when the predetermined torque for which the clutch is designed is exceeded;

Figure 4:
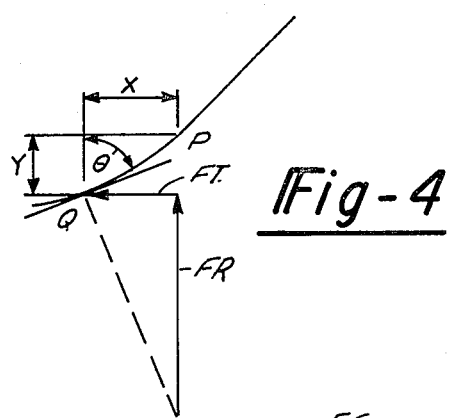

Referring to FIGS. 1 and 2, a drive shaft 10 is mounted in a bearing 12 in a housing 14; other support bearings and drive means for shaft 10 are not pertinent and are not shown. A cage 16 in the form of a sleeve flanged at one end is bolted or otherwise secured to the end of shaft 10 so as to rotate therewith. A gear 18 is rotatably mounted on cage 16 with a minimum of sliding friction therebetween and is axially positioned by a retainer 20 which is held in place on the outboard end of cage 16 by means of one or more set screws 22. A rack 24, suitably guided for linear movement, is in mesh with gear 18 and constitutes the output load of the system shown.

A longitudinal slot 26 is cut in cage 16 into which is closely, but rotatably, fitted a roller 28. Roller 28 in turn is seated in a longitudinal groove 30 on the inside diameter of gear 18. Groove 30 has converging sidewalls 32. Two additional grooves 34 and 36 are cut in cage 16, closely and equally spaced on either side of the opposite end of a diameter running through slot 26. Two rollers 38 and 40 are rotatably fitted into slots 34 and 36, respectively, and bear against the ungrooved cylindrical bore 42 of gear 18.

All three rollers 28, 38 and 40 are loaded radially outward by a flexure ring 44. This flexure ring (which may be formed from spring metal, for example) is made with a substantially uniform cross section and has a true circular form when in its relaxed or unloaded condition. The outer diameter of ring 44 is slightly greater than the circle defined by the radially innermost surfaces of rollers 28, 38, 40. Therefore, to assemble the flexure ring 44 into the assembly it must be deflected by a spreader or other comparable means.

Rings of this type have long been known in the art for the accuracy and linearity of their load deflection characteristics when loaded in tension or compression across a single diameter. When so loaded the deflection across the loaded diameter is given by:

$$D = .149 \frac{PR^3}{EI}$$

WHERE
 $D$ = deflection in inches
 $P$ = load in pounds
 $R$ = radius to neutral axis of ring, inches
 $E$ = Young's modulus of material
 $I$ = moment of inertia of cross section of ring in inches$^4$ The torque rating of a given clutch will depend on the preload deflection of flexure ring 44 and the contact angle of roller 28 in groove 30, as is explained below. When this torque is exceeded between cage 16 and gear 18, roller 28 rolls out of groove 30, thereby further deflecting ring 44 between itself and reaction rollers 38, 40. When roller 28 rolls on the cylindrical bore surface 42 of gear 18 true rolling action is achieved between all the heavily loaded components of the system. The only sliding contact in the system exists between the rollers and the slot walls of the cage and this is very light because of the low friction of the system. As cage 16 rotates with respect to gear 18 it can be seen that ring 44 will rotate at slightly more than twice their relative angular velocity.

After slightly less than 180° of rotation of cage 16 in a counter-clockwise direction with respect to gear 18 roller 38 will encounter groove 30 in gear 18. As it starts to fall into groove 30 it becomes unloaded since the entire reaction load will be taken by its adjacent roller 40, whereas normally the reaction load is shared between rollers 38 and 40. After roller 38 has regained contact with the cylindrical surface of bore 42 on the other side of groove 30 roller 40 will encounter groove 30. While roller 40 is "jumping" groove 30, the entire reaction load is taken by the adjacent roller 38. Therefore, it may be seen that rollers 38 and 40 will drop into groove 30 only very slightly due to the slight flexure of ring 44 as the load is transferred from two rollers to one; this in turn will cause a slight ripple in the idle torque of a magnitude far less than the engaged torque of the clutch.

After 360° of rotation of cage 16 with respect to gear 18, roller 28 will again fully reengage groove 30 and the full torque rating of the clutch is again required to disengage it. It will be noted that the re-engagement may occur from rotation in either direction. In a typical application external sensing means are provided to detect relative motion between shaft 10 and gear 18 which stops the drive means for shaft 10, which is then reversed to re-engage the clutch.

After a series of disengagements and reengagements flexure ring 44 may randomly tend to drift to one side or the other until it comes into contact with the cage, thereby limiting further drift. To eliminate the frictional sliding arising from such contact two auxiliary roller 46, 48 may be employed. Cage 16 is provided with two additional slots 50 and 52 located at the opposite ends of a diameter which is substantially perpendicular to the diameter passing through slot 26. Rollers 46, 48 are loosely fitted into these additional slots, the diameters of the rollers 46, 48 being slightly greater than the wall thickness of cage 16. Therefore, if flexure ring 44 should tend to drift to one side or the other, it will engage roller 46 or 48 and be limited from further drifting by a rolling contact therewith.

As was noted above, the torque rating of the clutch is dependent in part on the preload deflection of ring 44. Referring to FIG. 3, $F_{Ro}$ is the force exerted on roller 28 due to the preload deflection of ring 44; $\theta$ is the angle between wall 32 of groove 30 and a radial line from the center line of cage 16 and gear 18; $F_T$ is the tangential force required to cause roller 28 to roll on the groove wall. It can be seen, therefore, that:

$$\tan \theta = \frac{F_{Ro}}{F_T}$$

OR $$F_T = \frac{F_{Ro}}{\tan \theta}$$

If the radius to the point of contact is R the torque, T, developed is:

$$T = R \, F_T = R \, \frac{F_{Ro}}{\tan \theta}$$

However, $F_{Ro}$ is not a static quantity; as roller 28 moves in a direction out of the groove, the deflection of ring 44 is increased with the result that the force $F_R$ increases. FIG. 4 is a schematic diagram which indicates the required curvature of the groove wall in order that the magnitude of $F_T$ remains constant as the point of contact of the roller moves. Referring to FIG. 4, P is the initial point of contact of the roller on the groove wall. After it has moved to some other point, Q, the following situation exists: ring 44 has been deflected through an additional distance $y$, while the roller has moved through a tangential distance $x$; assigning the value $k$ to the load-deflection rate of ring 44, the radial force $F_R$ at point Q is:

$$F_R = F_{Ro} + k y$$

At point O:

$$\tan \theta = (dx/dy)$$

Therefore:

$$F_T = \frac{F_R}{\frac{dx}{dy}} = F_R \frac{dy}{dx}$$

$$F_T \, dx = F_R \, dy$$

$$F_T \, dx = (F_{Ro} + k y) \, dy$$

Integrating, $$F_T X = F_{Ro} Y + k \frac{y^2}{2}$$

OR $$X = \frac{F_{Ro}}{F_T} y + \frac{k y^2}{2 F_T}$$

This equation establishes the curve of the groove opening beyond the normal point of contact, in terms of the design parameters, such that the tangential force remains constant during release. This provides for a true constant torque release. It will be noted that the form of the equation indicates the curvature is parabolic.

Figure 5:
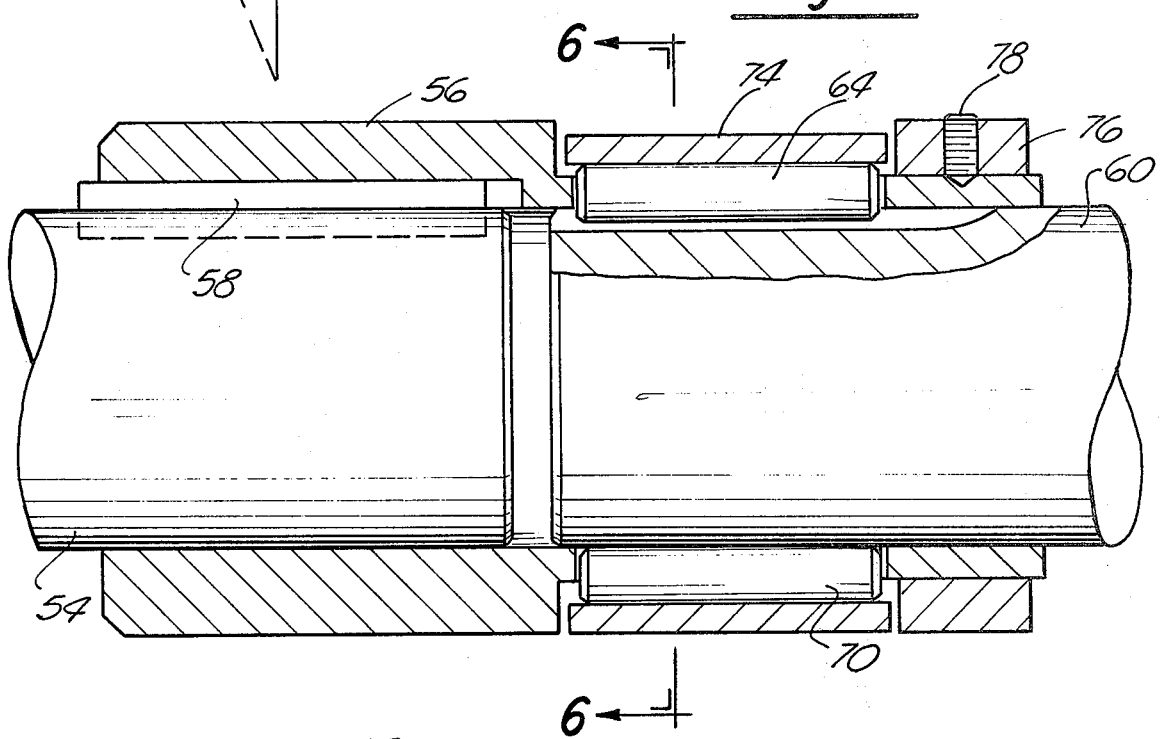
FIG. 5 is a fragmentary view, partly in section, of a second embodiment of clutch according to the present invention.
Figure 6:
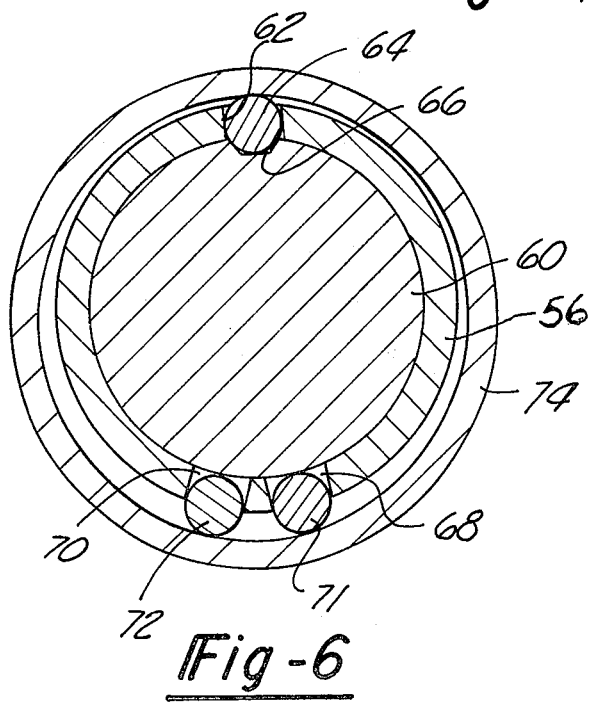
FIG. 6 is a sectional view along the line 6—6 in FIG. 5.

FIGS. 5 and 6 illustrate an embodiment of clutch of this invention in which the flexure ring is external to the rollers. A shaft 54 is keyed to cage 56 through a key 58. The extended sleeve section of cage 56 is free to rotate on a second shaft 60, except for the action of the rollers. A primary slot 62 is cut into cage 56 into which is closely, but movably, fitted a roller 64. Roller 64 extends through slot 62 and is seated on the inclined walls of a groove 66 in shaft 60.

Two secondary slots 68 and 70 are cut into cage 56 closely and equally spaced about the opposite side of a diameter passing through slot 62. Two secondary rollers 71 and 72 are closely, but movably, fitted into slots 68, 70 and bear against the cylindrical outer surface of shaft 60. All three rollers 64, 71, 72 are loaded radially inward by the flexure ring 74 which is thereby loaded in tension across substantially a single diameter. A retainer ring 76 is fastened to the outboard end of cage 56 through one or more set screws 78 to keep the flexure ring axially captive.

The operation of the clutch mechanism shown in FIGS. 5 and 6 is exactly the same as that of the mechanism shown in FIGS. 1 and 2, except that in this case the flexure ring is loaded in tension, whereas in the first case flexure ring 44 was loaded in compression.

Figure 6A:
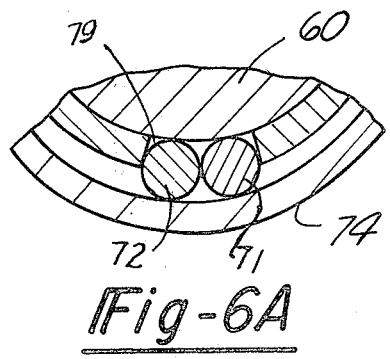
FIG. 6A is a fragmentary sectional view showing a modification of the embodiment of FIG. 6.
Figure 7:
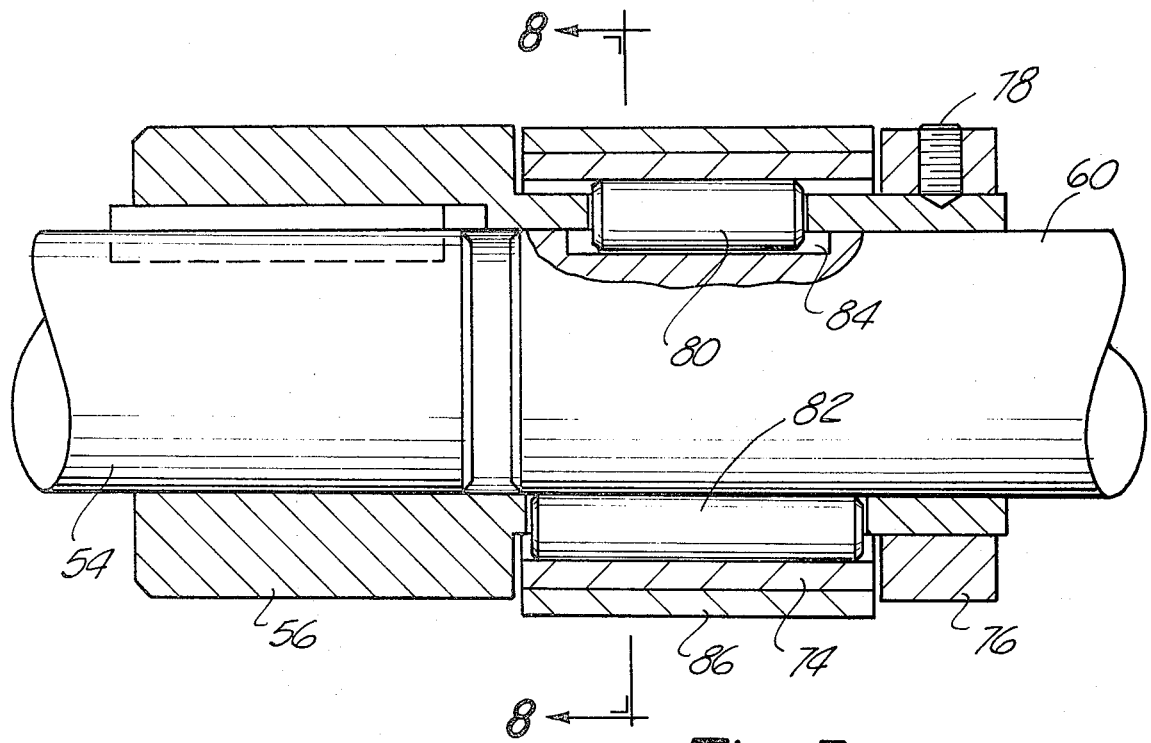
FIG. 7 is a fragmentary view, partly in section, of a third embodiment of clutch according to the present invention.
Figure 8:
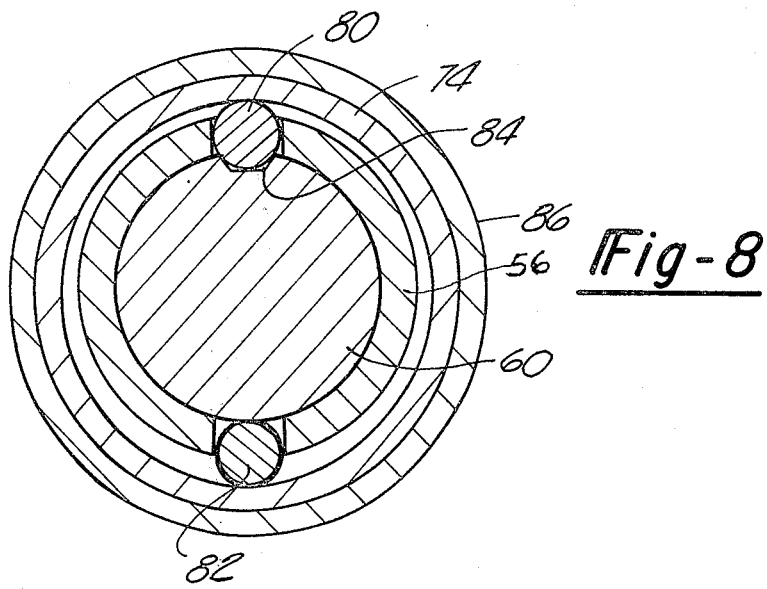
FIG. 8 is a sectional view along the line 8—8 in FIG. 7.

Slight variations in the external ring type assembly of FIGS. 5 and 6 are shown in FIGS. 6A, 7 and 8. In FIG. 6A the secondary rollers 71, 72 are in tangentially contacting relation within a single slot 79 in cage 56. The arcuate extent of slot 79 is just sufficient to accommodate the rollers. With this arrangement rollers 71, 72 will tend to drop into groove 66 to a lesser extent than when they are spaced apart, as in FIG. 6. This will reduce the ripple in the idle torque as these two rollers encounter groove 66.

In the embodiment shown in FIGS. 7 and 8 the primary roller 80 is shorter than the single secondary roller 82 and the groove 84 in the shaft 60 is also shorter than the secondary roller 82. Accordingly, when the clutch is disengaged and roller 82 passes over groove 84, it is prevented from dropping into the groove because the outer ends of roller 82 remain in contact with the cylindrical surface of shaft 60 at each end of groove 84.

In any particular design the beam stresses and contact stresses must be calculated to insure that the clutch is operating within the safe limits of the material from which the flexure ring is formed. For a given diametral flexure of the ring it will be found that a maximum wall thickness of the flexure ring is permissable. This in turn imposes a limit on the radial force obtainable. If a greater torque is required within that geometrical configuration, it may be achieved by adding a second flexure ring to the outside of an external flexure ring (for example, as shown at 86 in FIG. 8) or to the inside of an internal flexure ring. In either case the additional ring must be a sliding fit on the interface with the other ring.

We claim:

1. An overload clutch permitting only a single angular driving relationship between the driving and driven elements thereof comprising:
    a. a rotary driving member;
    b. a rotary driven member coaxial with the driving member;
    c. one of said members having a circular cylindrical bearing surface interrupted only by a single longitudinally extending groove therein, the other of said members being provided with a single primary slot extending longitudinally thereof and with longitudinally extending secondary slot means disposed substantially diametrically opposite said primary slot;
    d. a primary drive roller in said primary slot and seated in said groove when the clutch is driving;
    e. a secondary roller means in said secondary slot means;
    f. circumferentially continuous elastic ring means of substantially constant cross section and of substantially circular shape when relaxed, said ring means loading said primary roller into said longitudinal groove and being reacted by the secondary roller means to deflect the ring means into oval shape so that the diameter thereof in one direction is reduced and its diameter in a direction perpendicular thereto is increased; and
    g. means for preventing the secondary roller means from seating in the primary slot in a loaded condition by said ring means in response to relative rotation between the driving and driven members.

2. A clutch as called for in claim 1 wherein the secondary roller means comprises a plurality of closely spaced rollers, the spacing between said rollers being such that when one of said rollers encounters said primary slot an adjacent roller produces sufficient deflection of said elastic ring means to permit said one roller to readily roll out of the primary slot.

3. A clutch as called for in claim 2 wherein the secondary slot means comprises a plurality of closely spaced slots, one for each of said secondary rollers.

4. A clutch as called for in claim 1 wherein the secondary roller means comprises a roller having a length greater than the length of said primary slot, means positioning the secondary roller so that the opposite ends thereof extend beyond the opposite ends of said longitudinal groove to thereby prevent the secondary roller from seating in said longitudinal groove.

5. A clutch as called for in claim 1 wherein said longitudinal groove has curved side walls of parabolic sectional contour between the driving contact point with said primary roller and the cylindrical surface of said one member.

6. A clutch as called for in claim 1 wherein said elastic ring means comprises a first ring member loaded across a substantially single diameter and a second ring member slideably mounted coaxially on the first ring member.

7. A clutch as called for in claim 1 wherein said one member is provided with a central bore, said ring means being disposed within said bore and spaced radially inwardly thereof and said other member being disposed radially intermediate said one member and said ring means.

8. A clutch as called for in claim 1 wherein said one member comprises a shaft, said groove being formed on the outer cylindrical surface of said shaft, said elastic ring means extending circumferentially around said shaft in spaced relation thereto and said other member being disposed radially intermediate said shaft and said ring means.

9. A clutch as called for in claim 1 wherein said other member comprises a hollow sleeve having a pair of diametrically opposed slots therein lying substantially on a diameter perpendicular to a diameter extending through said primary slot and a roller seated in each of said additional slots, said last-mentioned rollers having a diameter at least slightly greater than the radial thickness of said sleeve to prevent sliding contact between said elastic ring and said other member.

10. A clutch as called for in claim 1 wherein said other member comprises a sleeve and said primary slot and secondary slot means extend radially through the wall of said sleeve.

11. A clutch as called for in claim 2 wherein the secondary slot means comprises a single slot.

12. A clutch as called for in claim 11 wherein the secondary rollers are disposed in generally tangentially contacting relation and the secondary slot has an arcuate extent corresponding generally to the cumulative diameters of the secondary rollers.

13. A clutch as called for in claim 12 wherein the secondary rollers consist of two rollers, all of said rollers being of substantially the same diameter.

* * * * *